(12) United States Patent
Ge

(10) Patent No.: US 9,555,372 B2
(45) Date of Patent: Jan. 31, 2017

(54) FUEL REFORMER FOR DE-NOX TRAP

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/593,340

(22) Filed: Jan. 9, 2015

(65) Prior Publication Data

US 2016/0199782 A1    Jul. 14, 2016

(51) Int. Cl.
| | |
|---|---|
| *B01D 53/96* | (2006.01) |
| *B01J 21/20* | (2006.01) |
| *B01J 23/90* | (2006.01) |
| *B01J 29/90* | (2006.01) |
| *C01B 3/24* | (2006.01) |
| *C01B 3/26* | (2006.01) |
| *C01B 3/34* | (2006.01) |
| *B01D 53/94* | (2006.01) |
| *F01N 3/20* | (2006.01) |

(52) U.S. Cl.
CPC ....... *B01D 53/9431* (2013.01); *B01D 53/9422* (2013.01); *F01N 3/2066* (2013.01); *B01D 2251/202* (2013.01); *B01D 2251/204* (2013.01)

(58) Field of Classification Search
CPC ............ B01D 53/96; B01J 21/20; B01J 23/90; B01J 29/90; C01B 3/24; C01B 3/26; C01B 3/34
See application file for complete search history.

(56) References Cited

U.S. PATENT DOCUMENTS

| | | | |
|---|---|---|---|
| 5,997,594 A | 12/1999 | Edlund et al. | |
| 6,758,035 B2* | 7/2004 | Smaling | C01B 3/36 422/177 |
| 6,776,809 B2 | 8/2004 | Shimazu | |
| 6,955,042 B1* | 10/2005 | Wnuck | F01N 3/035 60/286 |
| 7,066,973 B1 | 6/2006 | Bentley et al. | |
| 7,329,290 B2 | 2/2008 | Williamson et al. | |
| 8,460,409 B2 | 6/2013 | Hartvigsen et al. | |
| 8,728,180 B2 | 5/2014 | Hartvigsen et al. | |
| 8,747,496 B2 | 6/2014 | Neels et al. | |
| 2005/0252083 A1 | 11/2005 | Kitagawa et al. | |
| 2005/0257516 A1* | 11/2005 | Ancimer | B01D 53/8612 60/286 |
| 2007/0151232 A1* | 7/2007 | Dalla Betta | F01N 3/0814 60/286 |

(Continued)

FOREIGN PATENT DOCUMENTS

WO    WO 2014/053168 A1    4/2014

*Primary Examiner* — Timothy Vanoy
(74) *Attorney, Agent, or Firm* — Leydig, Voit & Mayer, Ltd.

(57) ABSTRACT

An emissions control system for an engine of a machine includes an exhaust conduit carrying a flow of exhaust gas from the engine, a de-NOx catalyst disposed along the exhaust conduit and configured to treat the flow of exhaust gas, a fuel reformer module configured to provide a gas stream containing hydrogen gas and carbon monoxide gas, and a junction disposed along the exhaust conduit between the engine and the de-NOx catalyst, the junction being arranged to mix at least a portion of the gas stream with the flow of exhaust gas such that the hydrogen gas and the carbon monoxide reach the de-NOx catalyst and act as reductants to regenerate the de-NOx trap.

18 Claims, 5 Drawing Sheets

(56) References Cited

U.S. PATENT DOCUMENTS

| | | | | |
|---|---|---|---|---|
| 2008/0118423 A1* | 5/2008 | Fattic | C01B 3/386 | 423/235 |
| 2008/0314020 A1* | 12/2008 | Hoard | F01N 3/0871 | 60/274 |
| 2009/0035192 A1* | 2/2009 | Hwang | B01D 53/90 | 422/170 |
| 2009/0260350 A1* | 10/2009 | Bromberg | B01D 53/90 | 60/286 |
| 2009/0308057 A1* | 12/2009 | Fresnet | F01N 3/0253 | 60/287 |
| 2010/0077734 A1* | 4/2010 | Shamis | F01N 3/0253 | 60/286 |
| 2012/0110981 A1* | 5/2012 | Hoard | F01N 3/0871 | 60/274 |
| 2013/0216473 A1* | 8/2013 | Nicole | F01N 3/04 | 423/651 |
| 2013/0312384 A1* | 11/2013 | Hwang | C01B 3/382 | 60/39.12 |
| 2014/0162154 A1 | 6/2014 | Hartvigsen et al. | | |

\* cited by examiner

FUEL REFORMER FOR DE-NOX TRAP

TECHNICAL FIELD

This disclosure relates generally to engine systems and, more particularly, to exhaust after-treatment systems and methods.

BACKGROUND

One known method for abating certain diesel engine exhaust constituents is by use of an exhaust after-treatment system that utilizes a Selective Catalytic Reduction (SCR) of nitrogen oxides. In a typical SCR system, urea or a urea-based water solution is mixed with exhaust gas. In some applications, a urea solution is injected directly into an exhaust passage through a specialized injector device. The injected urea solution mixes with exhaust gas and breaks down to provide ammonia ($NH_3$) in the exhaust stream. The ammonia then reacts with nitrogen oxides ($NO_x$) in the exhaust at a catalyst to provide nitrogen gas ($N_2$) and water ($H_2O$).

As can be appreciated, SCR systems require the presence of some form of urea close to the engine system such that the engine can be continuously supplied during operation. Various urea or urea-solution delivery systems are known and used in engine applications. In known urea injection systems, temperature-related challenges may arise that can affect the electronic and mechanical hardware used to inject the urea. For example, given that the urea is typically injected directly into the engine's exhaust system, the proximity of a urea injector device to hot engine exhaust may lead to injector component overheating, both during system operation as well as after heat saturation following a hot engine shut-down. Moreover, for systems using water-based urea solutions, freezing of the urea solution may cause component damage when the engine is not operating. Other issues include corrosion due to the nature of the urea solution on urea injection components and other, surrounding engine and vehicle components.

Alternatives to urea-based systems can include other types of NOx abatement devices such as lean NOx traps (LNT). LNTs, which can also be referred to as NOx adsorbers, typically include catalysts that reduce oxides of nitrogen emissions from a lean burn internal combustion engine. The nitrogen oxides that may become trapped on the catalyst can be released when the engine is operated in a rich burn as nitrogen gas and oxygen or water, in the presence of hydrogen. It has been suggested in the past that hydrogen gas may aid in regenerating a LNT, but no viable system has been implemented to date in production.

Hydrogen generation by fuel reformation is known from a different area of technology, fuel cells. For example, U.S. Pat. No. 7,066,973 (the '973 patent) describes an integrated reformer and shift reactor for producing hydrogen gas for a fuel cell. As is known, the fuel reformers such as the one described in the '973 patent are costly, complicated, and include various structures and operating areas that aim in reducing CO content in the hydrogen gas produced, because CO is detrimental to the operation of fuel cells for which the hydrogen gas is produced.

SUMMARY

The disclosure describes, in one aspect, an emissions control system for an engine of a machine. The emissions control system includes an exhaust conduit carrying a flow of exhaust gas from the engine, a de-NOx catalyst disposed along the exhaust conduit and configured to treat the flow of exhaust gas, a fuel reformer module configured to provide a gas stream containing hydrogen gas and carbon monoxide gas, and a junction disposed along the exhaust conduit between the engine and the de-NOx catalyst, the junction being arranged to mix at least a portion of the gas stream with the flow of exhaust gas such that the hydrogen gas and the carbon monoxide reach the de-NOx catalyst and act as reductants to regenerate the de-NOx trap.

In another aspect, the disclosure describes a fuel reformer. The fuel reformer includes an outer shell having an open end and a closed end. The outer shell has a substantially cylindrical shape that defines a cavity therein and extends along a centerline. A tube having an open end and a closed end is disposed concentrically relative to the outer shell along the centerline such that the open end of the tube is facing the closed end of the outer shell. At least a portion of an outer surface of the tube is coated with a catalyst. A first fuel conduit is fluidly connected to an interior of the tube, a steam conduit is fluidly connected to the interior of the tube, a second fuel conduit is fluidly connected to the cavity of the outer shell, and a water conduit is connected to a water injector disposed within the cavity of the outer shell. During operation, the interior of the tube operates as an auto-thermal reformer (ATR) that partially oxidizes fuel provided through the first fuel conduit, and the cavity operates as a steam reformer that strips hydrogen from hydrocarbons provided through the second fuel conduit by using steam created by water provided through the water injector and heat provided by an effluent gas from the ATR.

In yet another aspect, the disclosure describes a method for abating NOx in an exhaust flow of an internal combustion engine. The method includes providing a gaseous fuel to an auto-thermal reformer (ATR), which is configured to at least partially oxidize the gaseous fuel, providing air and water to a heat exchanger to produce steam and warmed air in the heat exchanger, and providing the steam and warmed air to the ATR at a controlled temperature. The method further includes providing an effluent gas from the ATR into a steam reformer, and further providing an additional amount of gaseous fuel and water to the steam reformer. The method includes carrying out chemical reactions in the steam reformer to produce a gas stream including hydrogen and carbon monoxide, mixing the gas stream with an exhaust flow of the internal combustion engine at a location upstream of a de-NOx catalyst, and using the hydrogen gas and carbon monoxide as reductants for regenerating the de-NOx catalyst.

DETAILED DESCRIPTION

This disclosure relates to emission treatment systems for machines and, more particularly, to emission treatment systems using a fuel reformer for on-board production of hydrogen gas for use in a de-NOx trap associated with an internal combustion engine. Advantageously, in one embodiment, hydrogen generation is carried out using waste heat from a dual or single-fuel engine that includes natural gas by using a steam reforming arrangement. Steam reforming is a method of producing Hydrogen gas (H2) from fuels containing hydrocarbons such as natural gas or liquid petroleum gas, which include light hydrocarbons such as Methane ($CH_4$), and also other compounds such as Methanol ($CH_3OH$). These compounds are reacted with steam at high temperatures over a catalyst. The heat input to the system required to generate steam and increase catalyst temperature is advantageously provided from the engine exhaust temperature. During the process, Hydrogen atoms are stripped from both the hydrocarbon molecules and the water in a two stage reaction to produce Hydrogen gas. In a first stage of the reforming process, hydrocarbon molecules are broken, in the presence or absence of water, to liberate Hydrogen atoms, which process also releases Carbon Monoxide (CO). In typical fuel cell applications, CO poisons most fuel cells, which is why, typically, known reforming reactions also include a second stage, known as the water gas shift reaction, in which the Carbon Monoxide is converted into Carbon Dioxide ($CO_2$) while simultaneously generating more Hydrogen.

In the instant disclosure, the hydrogen gas generated by the reformers described is used to regenerate a LNT, a certain portion of the CO that is produced, is also helpful to convert nitrogen oxides to N2 when CO is converted to $CO_2$ over the catalyst in a LNT (for example, in accordance with one possible reaction the follows the equation $NO+CO \Rightarrow \frac{1}{2} N_2+CO_2$). By controlling the reaction temperature of these reactions, and also by producing the water and heat involved in generating the steam for the various reactions, a complete emissions system can be implemented in accordance with the disclosure.

Figure 1:
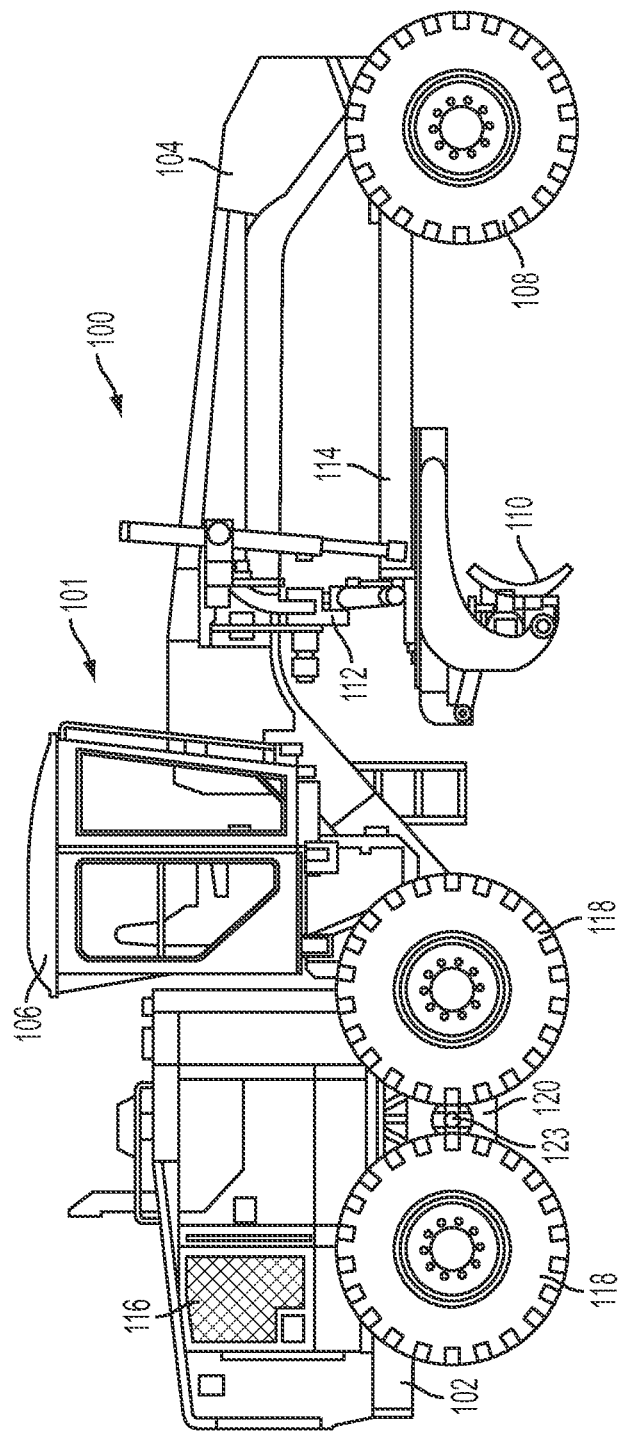
FIG. 1 is an outline view of a machine in accordance with the disclosure.

To provide context for one possible embodiment of the present disclosure, a side view of a machine 100, in this example a motor grader 101, is shown in FIG. 1. The term "machine" is used generically to describe any machine having at least one drive wheel that is directly driven by a motor connected to the wheel, for example, by use of electrical or hydrostatic power, or is alternatively driven by mechanical means by an engine through a transmission. The motor grader 101 shown in FIG. 1 generally includes a two-piece frame made up of an engine frame 102 and an implement portion 104. Alternatively, the motor grader 101 may include a single frame piece. The engine frame 102 in the embodiment shown is connected to the implement portion 104 by a pivot (not shown). The implement portion 104 includes an operator cab 106 and two idle wheels 108 (only one visible) that contact the ground. The engine frame 102 contacts the ground through two drive wheels 118, which are connected to one another by a tandem beam 120 that is connected to the engine frame 102 at a pivot 123. A shovel or blade 110 is suspended along a mid-portion of the implement portion 104. The blade 110 can be selectively adjusted to engage the ground at various heights and angles to achieve a desired grade or contour while the motor grader 101 operates. Adjustment of the position of the blade 110 is accomplished by a system of actuators, generally denoted in FIG. 1 as 112, while support for the loading experienced by the blade 110 during operation is accomplished by a bar 114, which pivotally connects the implement portion 104 to the blade 110.

The engine frame 102 supports an engine (shown and described relative to FIG. 2, below), which is protected from the elements by an engine cover 116. The engine provides the power necessary to propel the motor grader 101 as well as to operate the various actuators and systems of the motor grader 101. As can be appreciated, other machines may have different configurations and/or various other implements associated therewith. The engine cover 116 includes grates and other openings that allow air to pass over and cool engine components.

Figure 2:
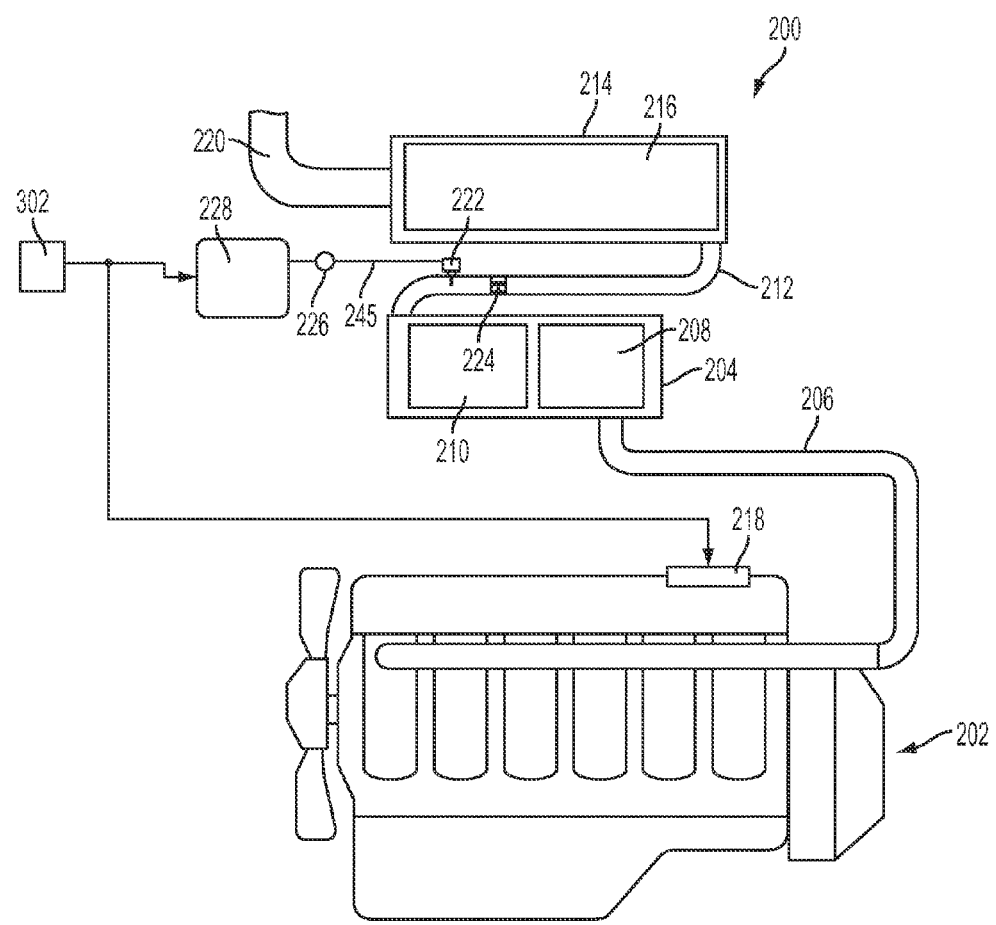
FIG. 2 is a block diagram of an engine having an after-treatment system in accordance with the disclosure.

FIG. 2 is a block diagram of an exhaust after-treatment system 200 associated with the engine 202 of the machine 100. The exhaust after-treatment system 200 may be modularly packaged as shown in the illustrated embodiment for retrofit onto existing engines or, alternatively, for installation on new engines. In the illustrated embodiment, the exhaust after-treatment system 200 includes a first module 204 that is fluidly connected to an exhaust conduit 206 of the engine 202. During engine operation, the first module 204 is arranged to internally receive engine exhaust gas from the exhaust conduit 206. The first module 204 may contain various exhaust gas treatment devices such as a diesel oxidation catalyst (DOC) 208 and a diesel particulate filter (DPF) 210, but other devices may be used. Exhaust gas provided to the first module 204 by the engine 202 may first pass through the DOC 208 and then through the DPF 210 before entering a transfer conduit 212.

The transfer conduit 212 fluidly interconnects the first module 204 with a second module 214 such that exhaust gas from the engine 202 may pass through the first and second modules 204 and 214 in series before being released at a stack 220 that is connected to the second module. In the illustrated embodiment, the second module 214 encloses a LNT or de-NOx catalyst 216. The de-NOx catalyst 216 operates to treat exhaust gas from the engine 202 in the presence of hydrogen, which is provided after reformation of fuel provided to a reformer module 228.

More specifically, the reformer module 228 operates to produce Hydrogen gas (H2) on board the machine 100 continuously or as required during operation, and provides the Hydrogen gas via a conduit 245 to an injector 222 that provides the same into the transfer conduit 212. When in the transfer conduit, the hydrogen gas is carried to the de-NOx catalyst 216 where it acts to reduce nitrogen oxides into Nitrogen gas (N2) and water (H2O). A valve 226 that operates to selectively control a flow of Hydrogen in response to a controller (not shown) command is disposed along the conduit 245. An optional mixer 224 may be disposed along the conduit 212 to homogenize a hydrogen containing gas mixture that is provided to the de-NOx catalyst 216.

Figure 3:
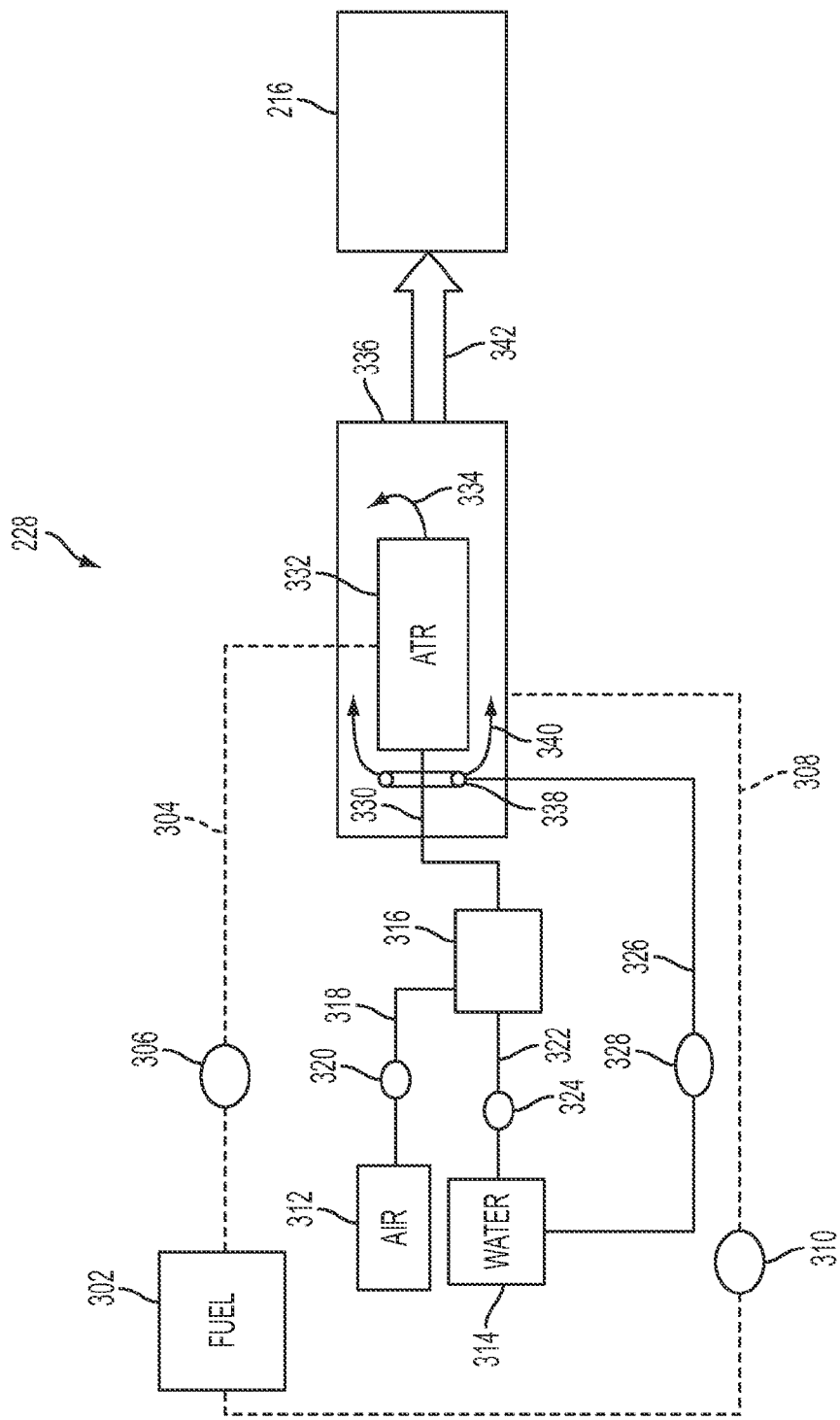
FIG. 3 is a block diagram of a fuel reformer in accordance with the disclosure.

A block diagram of one embodiment for the reformer module 228 is shown in FIG. 3. The reformer module 228 includes a fuel supply 302, which may be the same fuel supply as one of the fuels supplied to the engine 202. Fuel from the fuel supply 302, which may include natural gas or LPG, is provided to the reformer module via two conduits, a first fuel conduit 304, which includes a first fuel control valve 306, and a second fuel conduit 308, which includes a second fuel control valve 310. The reformer module 228 further includes an air source 312, which may be a source of compressed air used by the engine 202 or machine 100, and a water source 314. Water from the water source 314 may be provided from a water reservoir, which the machine operator replenishes regularly or as required, and/or may be water condensed or otherwise extracted from engine exhaust gas. In one embodiment, water vapor present in the exhaust gas of the engine may be mechanically separated using a substrate, and then condensed and collected for use as water provided to the reformer module 228 by the water source 314.

The reformer module further includes a heater 316, which is powered by heat from the exhaust gas flow of the engine. The heater 316 receives air through an air conduit 318, which includes an air control valve 320 that selectively meters the amount of air provided, and water through a first water conduit 322, which includes a first water control valve 324 that selectively meters the amount of water provided. The air conduit 318 is connected to the air source 312, and the first water conduit is connected to the water source 314. During engine operation, the heater 316 operates to extract heat from engine exhaust gas and transfer that heat to increase the temperature of air and water provided via the air conduit 318 and the first water conduit 322. In one embodiment, the heater 316 may be embodied as an enclosed section of exhaust pipe onto which water is injected to produce steam, which is captured by the enclosure and routed to a steam conduit 330.

An electronic controller 218 (FIG. 2) that is associated with the engine 202 is advantageously associated with sensors providing information indicative of exhaust gas temperature, air temperature, water temperature, and other parameters such that the controller can provide command signals to the various valves selectively controlling the flow of air and water to the heater 316. By inferring the heat available for transfer from the exhaust gas, and also by selecting the flow of fluids such as air and water, which have known latent heats, the electronic controller 218 can effectively control the temperature of steam provided through the steam conduit 330 to an auto-thermal reformer (ATR) 332.

In the embodiment shown, the ATR 332 performs autothermal reforming by using heat from the engine's exhaust gas to carry out an endothermic reaction. In a typical engine, a low exhaust temperature can be below 760 deg C., especially for engines running efficiently. This temperature, however, at sufficient exhaust flow can provide heat sufficient to vaporize water for the steam reformer. In the illustrated embodiment, the ATR 332 receives hydrocarbon fuel from the first fuel conduit 304, and also air (that carries O2) from the steam conduit 330 to carry out a main reaction, which is a partial oxidation of a hydrocarbon, for example, methane (CH4) according to Equation 1:

$$4CH4+O2+2H2O \Rightarrow 10H2+4CO \qquad \text{Equation 1}$$

The reactions similar to the reaction in Equation 1 generate heat, which is manifested as an effluent gas 334 from the ATR 332 and which in the illustrated embodiment can have a temperature of about 1,200° C.

The effluent gas 334 from the ATR 332 are provided to a steam reformer 336 so that their temperature can be tempered and the hydrogen gas production yield can be increased. In the steam reformer 336, heat that was generated by the partial oxidation reactions occurring in the ATR 332 will be absorbed, and the following reaction will take place according to the steam mole fraction and temperature of the participating compounds in accordance with Equations 2 and 3:

$$CH4+H2O \Rightarrow 3H2+CO \qquad \text{Equation 2}$$

$$CO+H2O \Rightarrow H2+CO2 \qquad \text{Equation 3}$$

Water from the second water conduit 326 is provided through a ring injector 338 disposed within the steam reformer 336, which turns to steam 340 when meeting the hot effluent from the ATR 332 and also the additional steam passing through the ATR 332 from the steam conduit 330. Additional fuel is provided through the second fuel conduit 308 to supply the hydrocarbons required to carry out the reaction in Equation 2.

As a result of these reactions, a gas flow 342 is provided to the de-NOx catalyst 216. The gas flow 342 is rich in hydrogen gas such that nitrogen oxides can be abated in accordance with Equations 4 and 5:

$$2NOx \Rightarrow N2+2Ox \qquad \text{Equation 4}$$

$$Ox+H2 \Rightarrow H2O \qquad \text{Equation 5}$$

In other words, when nitrogen oxides are catalyzed into nitrogen gas and oxygen, the hydrogen gas acts to create water with the oxygen such that nitrogen gas and water exit the catalyst.

In general, these processes can be controlled by the electronic controller 218 (FIG. 1), by selectively controlling the air, water and fuel flows to the various reactors shown in FIG. 3. It is also noted that, apart from temperature control of the gas flow 342 provided to the de-NOx catalyst 216, the function of the steam reformer to reduce CO concentration is of little to no importance in the present system. In fact, unlike fuel cell applications, a concentration of CO that is greater than 10 ppm in the gas flow 342 may be desired because it may promote further abatement of nitrogen oxides by further oxidizing CO into CO2 in the de-NOx catalyst area.

Figure 4:
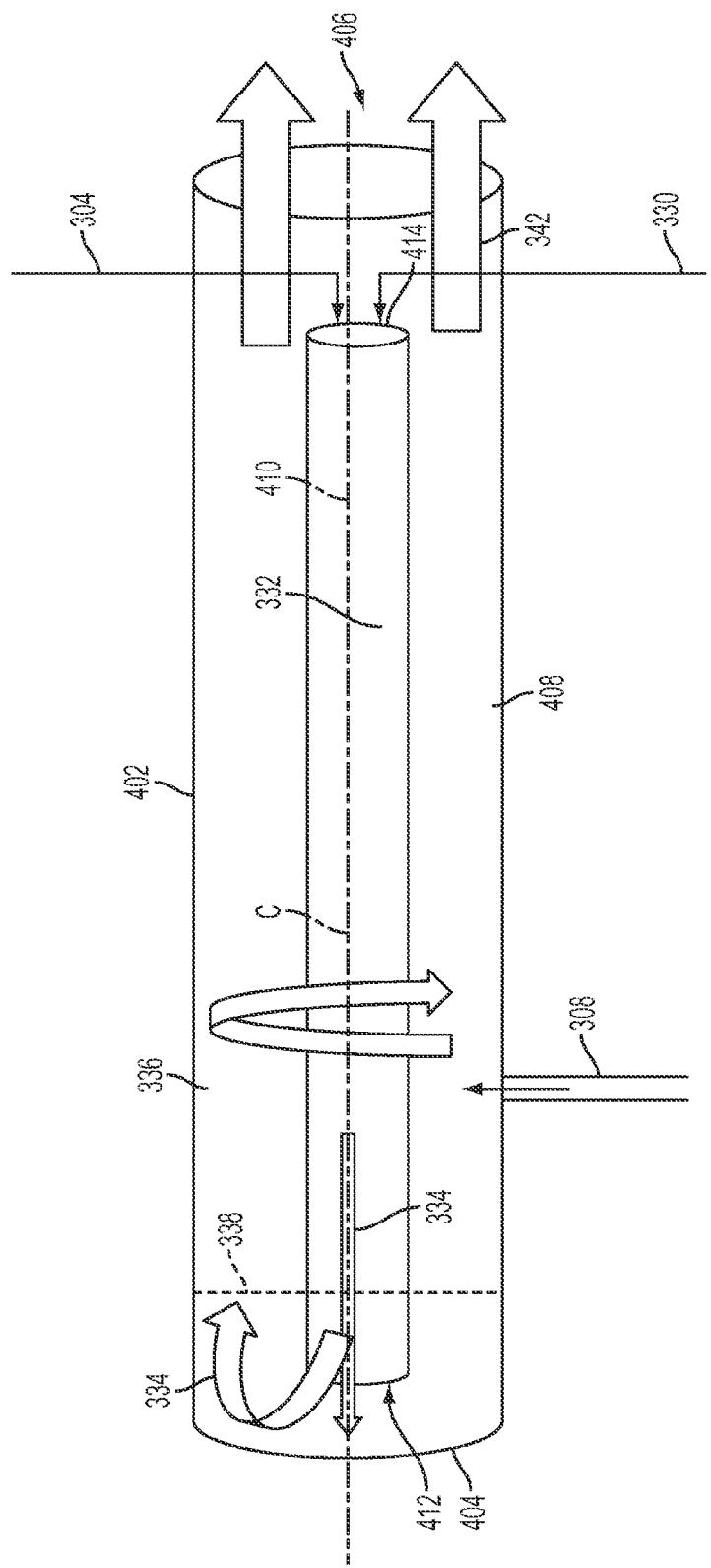
FIG. 4 is a schematic view of one embodiment for a fuel reformer in accordance with the disclosure.

In the embodiments shown, a compact arrangement in the ATR 332 has a cylindrical shape that is concentrically disposed within a steam reformer 336 having a cylindrical shape is contemplated. A schematic diagram of such an arrangement is shown in FIG. 4, where features and structures that are the same or similar to corresponding features and structures previously discussed are denoted by the same reference numerals previously used for simplicity. As can be seen from FIG. 4, the steam reformer 336 may be formed as a hollow cylindrical member or shell 402 having a closed end 404 and an open end 406. Disposed within an internal cavity 408 of the shell 402 is the ATR 332, which is formed as a tube 410 that extends concentrically along a centerline, C, of the shell 402. The tube 410 has an open end 412 that is adjacent the closed end 404 of the shell 402. The tube 410 has a closed end 414 from which it internally receives fuel from the first fuel conduit 304 and air/water from the steam conduit 330, as discussed above and shown in FIG. 3. The air and fuel react in accordance with Equation 1 above, and the products of the reaction (H2 and CO) exit the tube 410 from the open end 412 into the internal cavity 408 as the effluent gas 334 from the ATR, which is at an elevated temperature.

As the effluent enters the internal cavity 408, it meets the closed end 404 and is redirected towards the open end 406. As it travels along in the internal cavity 408, it mixes with water provided from the ring injector 338, and fuel provided from the second fuel conduit 308 (preferably, through an injector or other metering and/or distribution device), so that the reactions shown in Equations 2 and 3 are carried out. By the time the gases reach the open end 406, the gas flow 342 that is rich in hydrogen gas and also contains carbon monoxide in a concentration greater than 10 ppm is provided.

In the illustrated embodiment, a vast majority of the heat generated in the ATR can be recuperated by encaging the ATR within the cylindrical steam reformer. The effluent from the ATR enters the steam reformer when it flows through the exit port of the ATR. A catalyst substance of the steam reformer is placed between the external surface of ATR and the internal surface of the steam reformer such that the gases are in contact with the catalyst as they travel along the steam reformer.

During operation, compressed natural gas used as an engine fuel is also supplied to the steam reformer. The fuel supply can be controlled by a butterfly valve, needle valve, ball valve or the like. The ring injector 338 can be formed as a ring that surrounds the tube 410 and are placed close to the exit port of the ATR. When the effluent exit from ATR with high temperature, water is injected via a ring of injectors to generate steam and simultaneously decrease the temperature of the effluent. There are only fuel and water supply to steam reformer as shown. An air supply, although optional for additional cooling, is not required for the steam reformer. It is noted that the ratio of CO to hydrogen in the final effluent from the steam reformer can be adjusted by controlling fuel and steam supplied to both the ATR and the steam reformer by appropriate control of the various control valves by the electronic controller 218.

INDUSTRIAL APPLICABILITY

Figure 5:
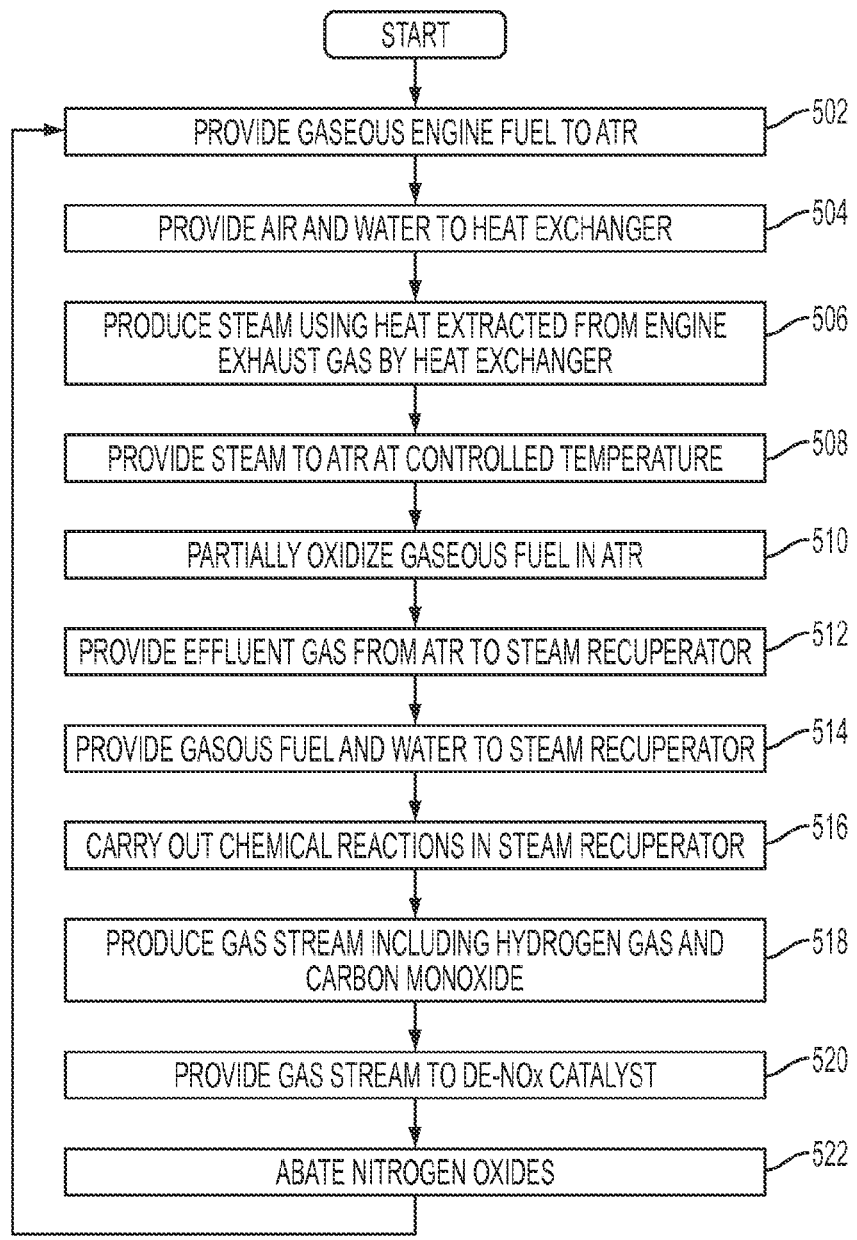
FIG. 5 is a flow chart for a method in accordance with the disclosure.

The present disclosure is applicable to after treatment systems for internal combustion engines using a fuel reformer. A flowchart for a method of reducing NOx emissions in an exhaust gas stream from an internal combustion engine operating at least partially on a gaseous fuel is shown in FIG. 5. The process includes providing a gaseous fuel of the engine to an auto-thermal reformer (ATR), which exothermally and partially oxidizes hydrocarbons, at 502. At 504, air and water are provided to a heat exchanger, which produces steam at 506 using heat extracted from engine exhaust gas. The steam is provided to the ATR at a controlled temperature at 508, and an exothermic, partial oxidation of the gaseous fuel is carried out at 510 within the ATR. Temperature control of the steam can be accomplished by controlling the flow rate of water and air provided to the heat exchanger based on the air, water and/or exhaust gas temperature, exhaust gas flow rate, desired steam temperature and/or pressure, and the like.

The ATR provides an effluent gas to a steam reformer, which physically surrounds the ATR, at 512. Gaseous fuel and water are also provided to the steam reformer at 514. Chemical reactions between hydrocarbons from the fuel, carbon monoxide from the ATR effluent, and water (steam) are carried out in the steam reformer at 516 to produce a gas stream at 518. The gas stream includes hydrogen gas and carbon monoxide (CO) in a concentration greater than 10 ppm, and is provided to a de-NOx catalyst that is in line with the engine exhaust stream at 520 such that nitrogen oxides can be abated at 522.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. An emissions control system for an engine of a machine, comprising:
   an exhaust conduit carrying a flow of exhaust gas from the engine;
   a de-NOx catalyst disposed along the exhaust conduit and configured to treat the flow of exhaust gas;
   a fuel reformer module configured to provide a gas stream containing hydrogen gas and carbon monoxide gas the fuel reformer module comprising
      a heat exchanger connected to an air source, a water source via a first water conduit, and the flow of exhaust gas, the heat exchanger operating to remove heat from the flow of exhaust gas and provide the removed heat to heat air and water provided to the heat exchanger from, respectively, the air source and the water source,
      an auto-thermal reformer (ATR) connected to a fuel source via a first fuel conduit and to the heat exchanger, the ATR operating to oxidize fuel from the fuel source to generate hydrogen gas, and
      a steam reformer having a cavity communicating with an outlet of the ATR such that an effluent gas product of the ATR is fluidly provided into the cavity of the steam reformer, the steam reformer further communicating with a second water conduit to receive additional water for converting to steam in the steam reformer; and
   a junction disposed along the exhaust conduit between the engine and the de-NOx catalyst, the junction being arranged to mix at least a portion of the gas stream with the flow of exhaust gas such that the hydrogen gas and the carbon monoxide reach the de-NOx catalyst and act as reductants to regenerate the de-NOx catalyst.

2. The emissions control system of claim 1, wherein the junction is a valve configured to selectively control a flow rate of the gas stream into the exhaust conduit.

3. The emissions control system of claim 1, wherein the ATR operates to at least partially and at least incompletely oxidize methane provided from the fuel source with air provided from the heat exchanger according to the reaction equation:

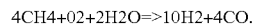

4CH4+O2+2H2O=>10H2+4CO.

4. The emissions control system of claim 1, wherein the cavity is fluidly connected to the fuel source and the water source via dedicated valves, each configured to selectively control an amount of fuel and water provided to the cavity of the steam reformer.

5. The emissions control system of claim 4, wherein the steam reformer operates to carry out the following chemical reactions using the effluent gas, water, and methane from the fuel source:

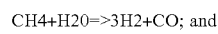

CH4+H2O=>3H2+CO; and

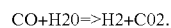

CO+H2O=>H2+CO2.

6. The emission control system of claim 5, wherein the steam reformer produces the gas stream that is provided to the junction.

7. The emissions control system of claim 4, wherein the cavity of the steam reformer has a generally cylindrical shape, and wherein water is provided to the cavity through a ring-shaped water injector.

8. The emissions control system of claim 1, wherein the heat exchanger is constructed as an enclosed section of the exhaust conduit into which water and fuel are injected.

9. A fuel reformer, comprising:
an outer shell having an open end and a closed end, the outer shell having a substantially cylindrical shape that defines a cavity therein and extends along a centerline;
a tube having an open end and a closed end, the tube disposed concentrically relative to the outer shell along the centerline such that the open end of the tube is facing the closed end of the outer shell, wherein at least a portion of an outer surface of the tube is coated with a catalyst;
a first fuel conduit fluidly connected to an interior of the tube;
a steam conduit fluidly connected to the interior of the tube;
a second fuel conduit fluidly connected to the cavity of the outer shell; and
a water conduit connected to a water injector disposed within the cavity of the outer shell;
wherein, during operation, the interior of the tube operates as an auto-thermal reformer (ATR) that partially oxidizes fuel provided through the first fuel conduit; and
wherein, during operation, the cavity operates as a steam reformer that strips hydrogen from hydrocarbons provided through the second fuel conduit by using steam created by water provided through the water injector and heat provided by an effluent gas from the ATR.

10. The fuel reformer of claim 9, wherein the steam reformer provides a gas stream that includes hydrogen gas and carbon monoxide, the carbon monoxide having a concentration greater than 10 ppm.

11. The fuel reformer of claim 9, wherein the ATR carries out a chemical reaction according to the following reaction equation:

$$4CH_4 + O_2 + 2H_2O \Rightarrow 10H_2 + 4CO.$$

12. The fuel reformer of claim 9, wherein the steam reformer carries out the following chemical reactions:

$$CH_4 + H_2O \Rightarrow 3H_2 + CO; \text{ and}$$

$$CO + H_2O \Rightarrow H_2 + CO_2.$$

13. A method for abating NOx in an exhaust flow of an internal combustion engine, comprising:
providing a gaseous fuel to an auto-thermal reformer (ATR), which is configured to at least partially oxidize the gaseous fuel;
providing air and water to a heat exchanger to produce steam and warmed air in the heat exchanger;
providing the steam and warmed air to the ATR at a controlled temperature;
providing an effluent gas from the ATR into a steam reformer;
further providing an additional amount of gaseous fuel and water to the steam reformer;
carrying out chemical reactions in the steam reformer to produce a gas stream including hydrogen and carbon monoxide;
mixing the gas stream with the exhaust flow of the internal combustion engine at a location upstream of a de-NOx catalyst; and
using the hydrogen gas and carbon monoxide as reductants for regenerating the de-NOx catalyst.

14. The method of claim 13, the carbon monoxide in the gas stream has a concentration greater than 10 ppm.

15. The method of claim 13, wherein the ATR carries out a chemical reaction according to the following reaction equation:

$$4CH_4 + O_2 + 2H_2O \Rightarrow 10H_2 + 4CO.$$

16. The method of claim 13, wherein the steam reformer carries out the following chemical reactions:

$$CH_4 + H_2O \Rightarrow 3H_2 + CO; \text{ and}$$

$$CO + H_2O \Rightarrow H_2 + CO_2.$$

17. The method of claim 13, wherein the internal combustion engine operates on the gaseous fuel as a primary fuel source.

18. The method of claim 13, wherein providing an additional amount of water to the steam reformer includes injecting water from a ring injector disposed within a cylindrical cavity of the steam reformer, the cylindrical cavity surrounding the ATR, which has a tubular shape and is disposed within the cavity of the steam reformer.

* * * * *

UNITED STATES PATENT AND TRADEMARK OFFICE
CERTIFICATE OF CORRECTION

PATENT NO.       : 9,555,372 B2                                        Page 1 of 1
APPLICATION NO.  : 14/593340
DATED            : January 31, 2017
INVENTOR(S)      : Xinyu Ge It is certified that error appears in the above-identified patent and that said Letters Patent is hereby corrected as shown below:

In the Claims

Column 8, Line 54, In Claim 3, delete "4CH4+02+2H2O=>10H2+4CO." and insert
-- 4CH4+O2+2H2O=>10H2+4CO. --.

Column 8, Line 65-66, In Claim 5, delete "CH4+H20=>3H2+CO; and CO+H20=>H2+C02." and
insert -- CH4+H2O=>3H2+CO; and CO+H2O=>H2+CO2. --.

Column 9, Line 45, In Claim 11, delete "4CH4+02+2H2O=>10H2+4CO." and insert
-- 4CH4+O2+2H2O=>10H2+4CO. --.

Column 10, Line 1-2, In Claim 12, delete "CH4+H20=>3H2+CO; and CO+H20=>H2+C02." and
insert -- CH4+H2O=>3H2+CO; and CO+H2O=>H2+CO2. --.

Column 10, Line 30, In Claim 15, delete "4CH4+02+2H2O=>10H2+4CO." and insert
-- 4CH4+O2+2H2O=>10H2+4CO. --.

Column 10, Line 35-36, In Claim 16, delete "CH4+H20=>3H2+CO; and CO+H20=>H2+C02." and
insert -- CH4+H2O=>3H2+CO; and CO+H2O=>H2+CO2. --.

Signed and Sealed this
Sixteenth Day of May, 2017

Michelle K. Lee
*Director of the United States Patent and Trademark Office*